United States Patent Office 3,695,844
Patented Oct. 3, 1972

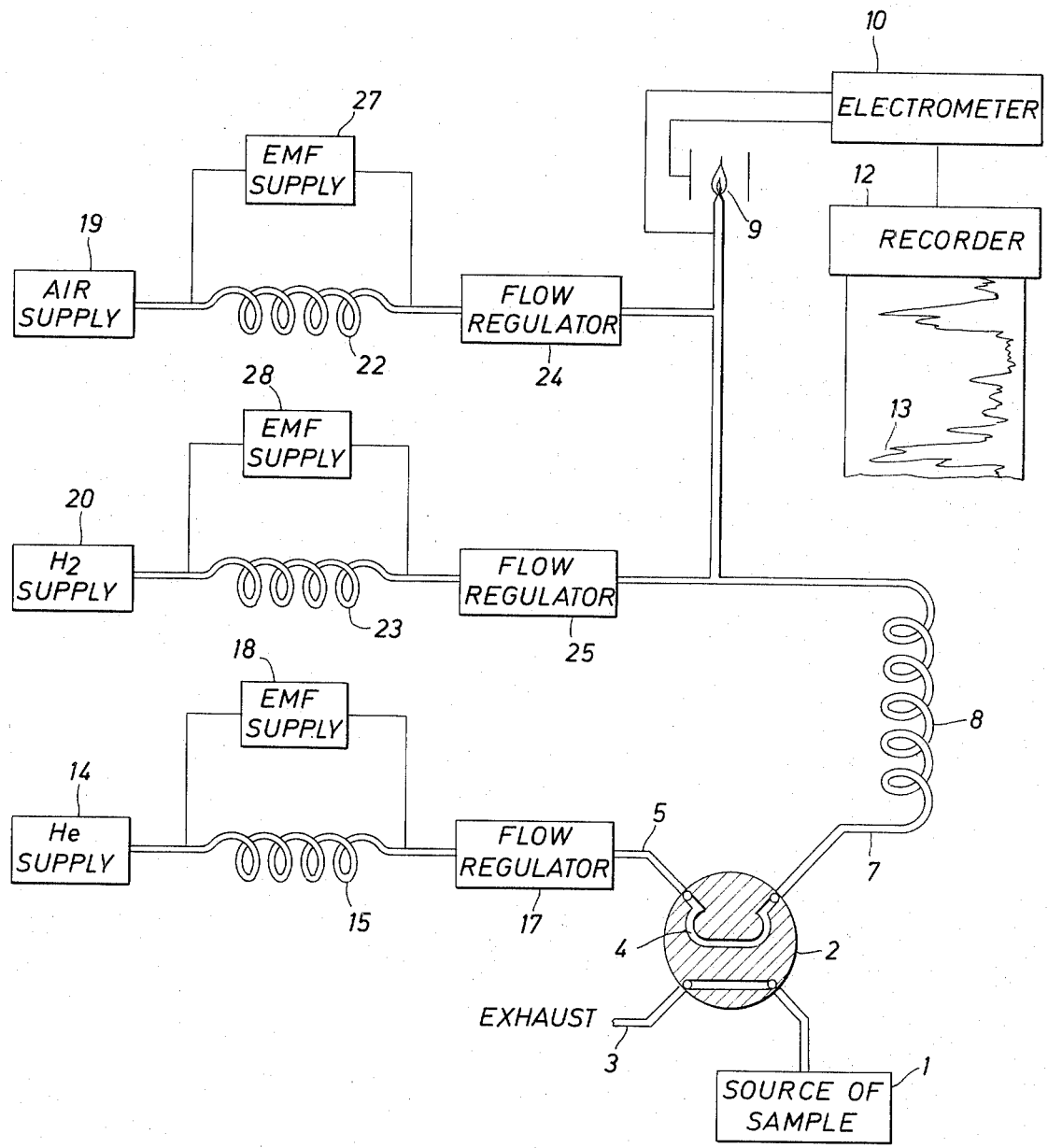

3,695,844
GAS CLEANING CONDUIT
Harold L. Wise, Arley Walters, and Ray G. Cook, Houston, Tex., assignors to Shell Oil Company, New York, N.Y.
Filed Sept. 28, 1970, Ser. No. 75,858
Int. Cl. G01n 31/08, 31/12
U.S. Cl. 23—232 C
2 Claims

ABSTRACT OF THE DISCLOSURE

A gaseous fluid is freed of a heat-sensitive contaminant by flowing the fluid through a capillary sized conduit having metal walls through which an electric current is flowed to heat the fluid within the conduit to at least about 700° C.

BACKGROUND OF THE INVENTION

The invention relates to removing a heat-sensitive contaminant from a gaseous fluid. It is particularly useful with respect to removing small amounts of hydrocarbon contaminants from gases being used in analytical procedures, such as chromatographic analysis, flame ionization detection, cold-trapping and fractional distillation, or the like.

In vapor phase chromatography, which is a particularly sensitive and convenient analytical procedure for measuring the hydrocarbon content of a volatile material, the desirability of cleaning gases used as carriers, etc., is discussed in text books such as "The Practice of Gas Chromatography," by L. S. Etre and Albert Zlatkis, Interscience Publishers, 1967. The authors of such texts stress the value of the gas-cleaning operations even when they require the use of relatively costly and time-consuming equipment and techniques, such as a diffusion of hydrogen through a palladium-silver alloy, a cold-trapping of hydrocarbon contaminants from a gas, a heating of air in relatively large volume furnace chamber filled with porous copper oxide and/or a ceramic material such as firebrick, or the like.

SUMMARY OF THE INVENTION

The invention relates to removing a heat-sensitive contaminant from a gaseous fluid by flowing the fluid through a conduit having metal walls through which an electric current is flowed to heat the walls and cause the fluid to be heated to a temperature of at least about 700° C. The invention is particularly advantageous in removing hydrocarbon contaminants from gases used in analytical procedures involving measurements of the hydrocarbon content of materials.

The present invention is at least in part based on a discovery that metals having relatively high strengths, electrical resistivities and thermal stabilities and heat-sensitive contaminants of relatively heat-stable gases involve a combination of properties such that a substantially capillary-sized column of such a metal can serve as a gas-cleaning conduit for conveying the gases while rapidly and economically removing the heat-sensitive contaminants by pyrolytically converting them to noninterfering materials, such as carbon, carbon dioxide, water, etc. This procedure is particularly advantageous with respect to removing hydrocarbon contaminants from relatively inert gases, such as air, helium, nitrogen, hydrogen, carbon dioxide, or the like, that are used in carrying or displacing materials within a chromatographic column, evaporating frozen materials from a cold trap, conveying a sample and/or combustive materials to the burner of a flame ionization detector, or the like. The present type of gas cleaning can be accomplished by means of a relatively small-sized and inexpensive conduit for conveying the gas. Such gas-cleaning conduits are capable of providing results which are equivalent (in their extent of cleaning) to more time-consuming and expensive procedures, such as those described in the text book referred to above. The present devices can be operated with start-up times which are very short with respect to those required by the prior devices.

Using methane as an example of a contaminant to be removed from an oxygen-containing gas such as air or a mixture of oxygen and at least one gas such as nitrogen, helium, carbon dioxide, etc., a reaction by which the contaminant is removed is:

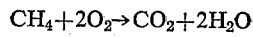

In a nonoxidative atmosphere in which a heat-sensitive contaminant such as methane is present in one or a mixture of gases, such as helium, nitrogen, hydrogen, carbon dioxide, etc., a reaction by which the contaminant is removed is:

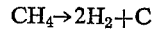

DESCRIPTION OF THE DRAWING

The drawing is a schematic illustration of a system for using the present invention in a process for chromatographically analyzing gaseous samples by measuring their concentration of at least one hydrocarbon. In the system shown in the drawing, samples from a source of sample 1 are flowed into a multiport valve 2 which is arranged to provide various interconnections between exhaust port 3, trap loop 4, and conduits 5 and 7.

With valve 2 in the position shown, fluid flows from sample source 1 to exhaust port 3. When the position of the valve is reversed, fluid from sample source 1 flows through and fills trap loop 4. Switching the valve back to the position shown causes the fluid in the trap loop to be displaced through conduit 7, into chromatographic column 8 and subsequently into burner 9. Electrometer 10 detects the extent of ionization within the flame of the burner and supplies an electrical signal to recorder 12 to be displayed as a series of chromatograms 13.

In displacing a sample from trap loop 4 to the flame ionization detector a gas, such as helium, is inflowed, from a supply source 14 through metal-walled conduit 15, and flow regulator 17, into conduit 5, which is connected to valve 2. The metal-walled conduit 15 is arranged to clean the inflowing gas in accordance with the present invention. The conduit and the gas flowing through are heated by flowing an electric current, from a supply of electromotive force 18, through the conduit wall at a rate causing the resistive heating of the metal to increase the temperature within the conduit to at least about 700° C.

In one embodiment of the present invention, the metal conduit through which the gas is flowed comprises about 10 feet of 0.034 inch 310 stainless steel tubing. The gas is supplied at about 120 pounds per square inch at a flow rate of about 1000 cc. per minute. The current source comprises a supply of 120 volt alternating current which is converted, by means of a commercially available variable voltage control and transformer, to a 12 volt supply of current flowing at a rate that is regulated to produce and maintain a temperature at about 800° C. within the tubing.

In such a system, about 500 watts of electric power reduces the hydrocarbon content of commercially available tanked "Breathing Air" to significantly less than one part per million. The time required to displace untreated air from the system and begin supplying air that is essentially hydrocarbon-free is less than about one minute.

In the system shown in the drawing, air and hydrogen are similarly inflowed from sources 19 and 20, cleaned within metal-walled conduits 22 and 23, regulated by flow regulators 24 and 25 and are mixed with gases flowing to the burner 9. The E.M.F. sources 27 and 28 supplying the currents that flow through the walls of conduits 22 and 23 can be individual sources or the same source that is connected to conduit 15.

In general, conventional equipment and techniques can be utilized in supplying and regulating the flow of one or more gases such as air, oxygen, helium, hydrogen, nitrogen, carbon dioxide to a flame ionization detector, cold trap and/or a chromatographic column. Such gases can be intermixed within a common chamber or conduit (as shown in the drawing, where the gases are mixed within a conduit leading to burner 9) or can be conveyed through separate conduits and mixed in or near a device such as a cold trap, column, burner, or the like.

Electrometer 10 can comprise substantially any means for detecting the extent with time of the ionization of gases within the flame of a burner. Such an electrometer is preferably connected between an electrically conductive metal portion of the barrel of a burner and a reference potential in the manner described in U.S. Pat. 3,451,780.

In a preferred embodiment, the column and burner-containing portion of a chromatographic analysis system of the type shown in the drawing (i.e. the portion inclusive of gas supplies 14, 19, and 20, conduits 5 and 7 and the interconnecting conduits within valve 2 and extending into burner 9) is preferably maintained at a pressure which is high relative to the pressure at which a gaseous fluid to be analyzed is supplied from a sample source such as source 1. The ratios of such pressures can advantageously be in the order of 10 to 1. In such a situation, when the position of valve 2 is opposite from that shown, the loop 4 is filled with a gaseous sample at a pressure of sample source, for example, at about 1 atmosphere. When the valve position is reversed (to return to the position shown) the volume of the gas in trap loop 4 is compressed to about $\frac{1}{10}$ of its original volume, due to the inflowing of relatively high pressure gas within the burner and column-containing portion of the system. When such a sample contains a mixture of gases such as trace amounts of hydrocarbons in air, the sample is compressed to a mixture having a ten times greater hydrocarbon concentration in terms of mass per unit volume. Such a concentration enhances the rate at which the hydrocarbons are absorbed onto the chromatographic column and causes them to be more separated (by absorption, elution and displacement within the column) into distinguishable events in the response of a flame-ionization detecting system.

When a sample being analyzed is compressed, the cleanness of the compressing gas is particularly important. For example, if a sample in trap loop 4 contains 9 cc. of air mixed with 1 cc. of hydrocarbons, upon compression, it becomes 9 cc. of helium mixed with 0.9 cc. of air and 0.1 cc. of hydrocarbons when the valve 2 is positioned as shown and the sample is displaced by the inflowing of helium at a pressure ten times greater than that of the sample source. In such a procedure, any hydrocarbon in the sample-compressing helium would cause a significant error in the measurement of the hydrocarbon content of the sample.

A metal-walled conduit utilized as a gas cleaning conduit of the present invention is preferably a long, thin tube having an internal diameter of less than about 1 millimeter, e.g. having an internal diameter within the size range of capillary columns. Such a conduit should have relatively thin metal walls that are composed of heat-stable and electrically resistive materials, such as stainless steel or an alloy having heat-stability and electrical-resistivity and strength properties similar to those of stainless steel.

A gas being cleaned in accordance with this invention can be flowed through one or a plurality of gas cleaning conduits which are connected in series or in parallel. The number, length, and diameter of the conduits should be selected to provide a combination of:

(a) sufficient residence time, (b) sufficient temperature and (c) a sufficient extent of removal of the contaminant while providing the desired rate of gas flow. Particularly suitable gas cleaning conduits are relatively thin-walled, stainless steel, capillary tubes such as those having internal diameters from about .02 inch to .03 inch. Such tubes having length of from about 5 feet to 10 feet, are suitable for use in vapor-phase chromatography. Such tubes can be resistively heated to a temperature of from about 700° to 1000° C. and are preferably heated to temperatures of from about 800° to 900° C.

It will be apparent to those skilled in the art that the present gas cleaning conduits and procedures are applicable to substantially any type of chromatographic analysis system. For example, they can be used with a system employing thermal conductivity, radiation, or the like means of detecting the presence of the component being measured. The invention is also applicable to other operations such as the cold-trapping and/or selective vaporization of solids, the displacing of measured amounts of reactants which are free of contaminants, or the like systems or procedures that utilize a relatively heat-stable gaseous fluid that should be cleaned by a removal of a relatively small amount of a heat-sensitive contaminant.

What is claimed is:

1. In a process in which a gaseous fluid being analyzed for hydrocarbon content by a displacement through a chromatographic column and into a flame ionization detector is mixed with a gaseous second fluid that is relatively heat-stable but contains a heat-sensitive hydrocarbon contaminant, the improvement which comprises:
    treating said second fluid prior to said mixing by
    (a) flowing it through a conduit having a metal wall and an effective inner diameter within the size range of capillary columns;
    (b) concurrently flowing an electric current through the wall of said conduit at a rate causing a resisting heating of the wall; and
    (c) correlating the rates of flow of said fluid and electric current so that the fluid is heated to at least about 700° C. for a time sufficient to decompose a significant proportion of the heat-sensitive contaminant while said fluid is flowing at a rate that facilitates said analysis.

2. In a chromatographic analysis apparatus in which a measurement is made of the hydrocarbon content of a first gas that is mixed with a second gas during a displacement of the first gas through a chromatographic column and into a flame ionization detector, the improvement which comprises:
    a stainless steel capillary tube having an effective inner diameter within the size range of capillary columns that is connected between said chromatographic column and a source of said second gas and between the terminals of a source of electromotive force;
    gas flow control means for controlling the rate of flow of said second gas;
    electric current flow control means for controlling the rate of flow of said electric current through said tube;
    means for mixing the so-treated second gas with said first gas and measuring the hydrocarbon content of the mixture; and
    said flow control means arranged so that the tube is resistively heated and the gas flowing through the tube is heated to at least 700° C. for a time sufficient to decompose a significant proportion of any hydrocarbon contaminant that is present in said second gas while that gas is flowing at a rate that facilitates said analysis.

(References on following page)

References Cited

UNITED STATES PATENTS

| | | | |
|---|---|---|---|
| 2,376,145 | 5/1945 | Horvitz | 23—254 |
| 3,248,441 | 4/1966 | Soderquist et al. | 48—196 X |
| 3,169,389 | 2/1965 | Green, Jr. et al. | 73—23.1 |
| 2,384,368 | 9/1945 | Crouch et al. | 23—232 X |
| 3,432,272 | 3/1969 | Emich | 23—254 |
| 2,826,480 | 3/1958 | Webster | 23—232 X |
| 3,236,603 | 2/1966 | Durrett et al. | 23—232 X |

JOSEPH SCOVRONEK, Primary Examiner

U.S. Cl. X.R.

23—2 C, 4, 232 R, 232 E, 254 R, 254 E; 73—23.1